Aug. 10, 1926.
C. W. CROWELL
1,595,859
INTERNAL COMBUSTION ENGINE
Filed June 9, 1923   2 Sheets-Sheet 1
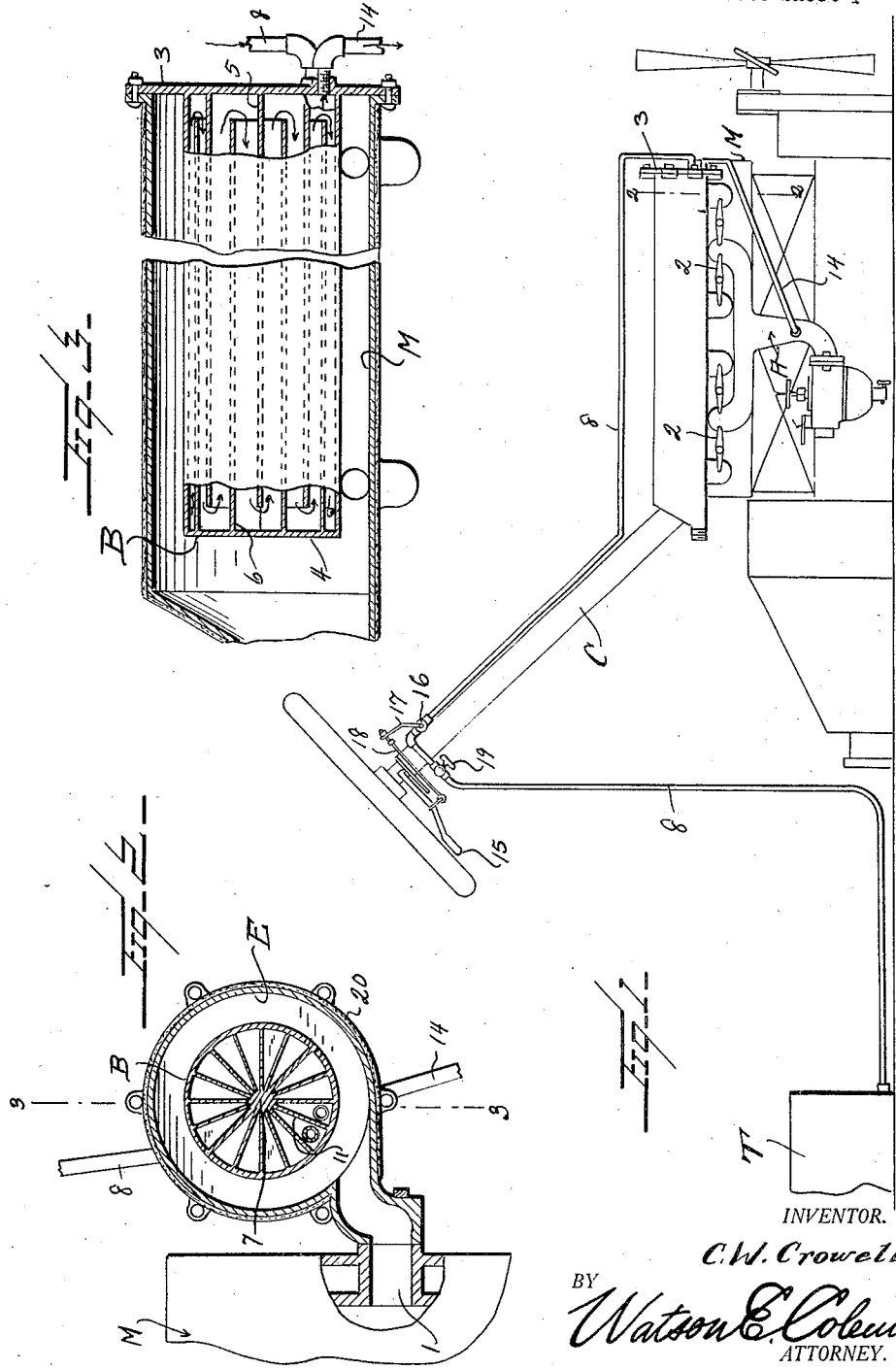
INVENTOR.
C.W. Crowell
BY Watson E. Coleman
ATTORNEY.

Aug. 10, 1926.
C. W. CROWELL
1,595,859
INTERNAL COMBUSTION ENGINE
Filed June 9, 1923    2 Sheets-Sheet 2
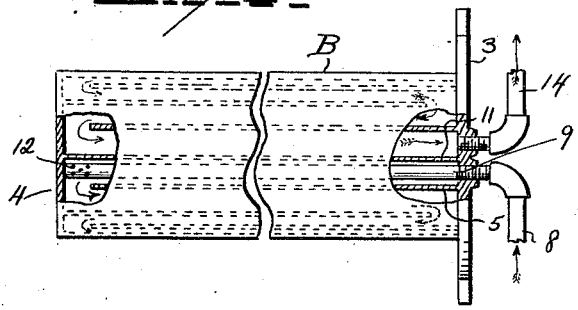
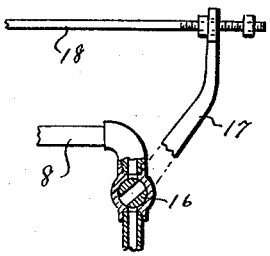
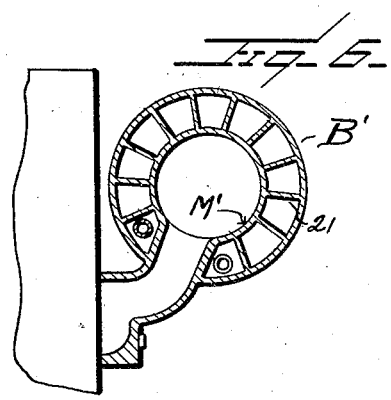
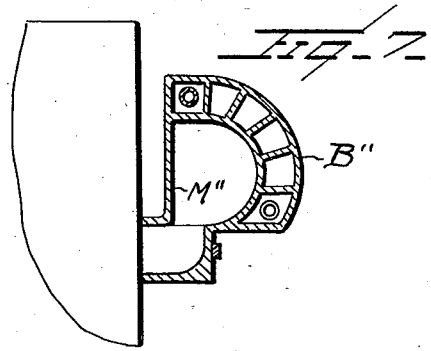
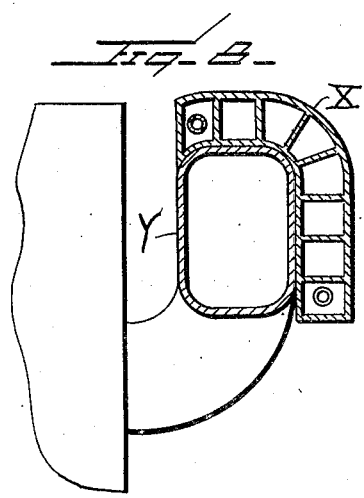
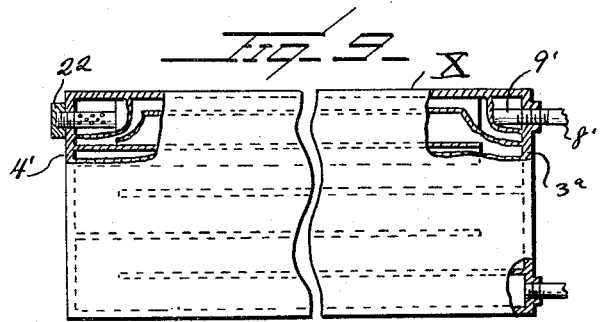
INVENTOR.
C. W. Crowell
BY Watson E. Coleman
ATTORNEY.

Patented Aug. 10, 1926.

1,595,859

UNITED STATES PATENT OFFICE.

CHARLES W. CROWELL, OF SALISBURY, NORTH CAROLINA.

INTERNAL-COMBUSTION ENGINE.

Application filed June 9, 1923. Serial No. 644,397.

This invention relates to certain improvements in internal combustion engines and it is an object of the invention to provide novel and improved means whereby superheated steam is generated in large quantities to be used as fuel for motive power, having just enough of carburetted air or other explosive fuel admixed with said steam to assure combustion, thereby saving expensive fuel and assuring a smooth running engine clear of carbon deposits.

It is also an object of the invention to provide novel and improved means for commingling superheated steam with the carburetted air for facilitating and increasing the combustion of the fuel and which results in greater efficiency being obtained for a given amount of fuel.

Furthermore it is an object of the invention to provide novel and improved means for admixing superheated steam within the carburetted air together with means under control of the throttle lever for regulating the admission of said steam to the carburetted air whereby the proper mixture is assured under all running conditions.

Another object of the invention is to provide novel and improved means for admitting superheated steam within the carburetted air and wherein the requisite heat for converting the water into such superheated steam is obtained from the exhaust manifold of the engine.

The invention consists in the details of construction and in the combination and arrangement of the several parts of my improved internal combustion engine whereby certain important advantages are attained and the device rendered simpler, less expensive and otherwise more convenient and advantageous for use, as will be hereinafter more fully set forth.

The novel features of my invention will hereinafter be definitely claimed.
In order that my invention may be the better understood, I will now proceed to describe the same with reference to the accompanying drawings, wherein:—

Figure 1 is a fragmentary sectional view of somewhat a diagrammatic character illustrating an internal combustion engine provided with an apparatus constructed in accordance with an embodiment of my invention;
Figure 2 is an enlarged sectional view taken substantially on the line 2—2 of Figure 1;

Figure 3 is a sectional view taken substantially on the line 3—3 of Figure 2 certain of the parts being indicated by broken lines;

Figure 4 is a view in top plan with portions broken away of the boiler as disclosed in Figures 2 and 3;

Figure 5 is a fragmentary view partly in section and partly in elevation of the means for operating the regulating or controlling valve comprised in the apparatus as illustrated in Figure 1;

Figure 6 is a fragmentary view partly in section and partly in elevation illustrating a further embodiment of my invention;

Figure 7 is a fragmentary view partly in section and partly in elevation illustrating another embodiment of the invention;

Figure 8 is a view similar to Figure 7 disclosing a still further form of the invention;

Figure 9 is a view partly in side elevation and partly in section of the boiler as illustrated in Figure 8, certain of the parts being indicated by broken lines.

In the embodiment of my invention as particularly disclosed in Figures 1 to 5 of the accompanying drawing, M denotes an internal combustion engine of a conventional type wherein the exhaust port 1 of each cylinder is in communication with the exhaust manifold E. This manifold is initially made of a size larger than the type of manifolds generally employed and said manifold is held in applied position as at 2 in any ordinary or preferred manner.

One end of the manifold E is closed by a plate or head 3 which carries a boiler B disposed within the manifold E and extending along the major portion thereof. The boiler B as herein disclosed is substantially cylindrical in form and of a maximum diameter less than the interior diameter of the manifold E so that a space is provided around the boiler B wherein circulates the exhaust from the engine whereby the boiler B is effectively heated by the products of combustion.

The inner or inserted end of the boiler B is closed by the head 4 and extending inwardly of the boiler B from the heads 3 and 4 are the partition plates 5 and 6, said plates being radially disposed and having their inner marginal portions connected as indicated at 7 in Figure 2. The partitions 5 carried by the head 3 terminate inwardly of but in relatively close proximity to the head 4 while the partitions 6 terminate inwardly of but in close proximity to the head 3. The plates 5 and 6 are also alternately arranged.

T denotes a tank adapted to contain a suitable supply of water and which has leading therefrom a pipe or conduit 8 extending within the boiler B through the head 3 and terminating immediately adjacent to the head 4. The inserted portion 9 of the conduit 8 is positioned between a partition 5 and a partition 11 completely bridging the space between the heads 3 and 4. That part of the portion 9 of the conduit 8 outwardly of the free end of the adjacent partition 5 is provided in its wall with the discharge openings 12.

In communication with the boiler B through the head 3 and at the opposite side of the partition 11 is a conduit 14 which leads to and is in communication with the intake manifold A of the motor M.

The conduit 8 extends through the upper portion of the steering post column C or the like and immediately adjacent to the throttle lever 15. Interposed in the conduit 8 is a rotary valve 16 with which is associated an operating arm or lever 17. Engaged with the outer portion of the arm 17 is a rod 18 also operatively engaged with the lever 15 so that the valve 16 will be automatically moved into open or closed position as the lever 15 is manipulated, and such movement of the valve 16 being in accordance with the extent of movement of the lever 15.

Also interposed in the conduit 8 is a second valve 19 adapted to be operated independently of the valve 16 and to provide further means for regulating or controlling the flow through the conduit 8.

When the motor M is in operation the pulsations of the pistons will draw water from the tank T through the conduit 8 into the boiler B and said water before being discharged through the openings 12 will be heated as it passes through the portion 9 of the conduit 8 so that when the water is discharged within the boiler B insuring the outer wall of the boiler or the adjacent partitions 5 and 6 from cracking as the water strikes it. In fact as the water passes through the portion 9 it is substantially converted into steam and as such steam is drawn through the tortuous conduit provided between the partitions 5 and 6 said steam will be superheated and which superheated steam will be drawn through the conduit 14 into the intake manifold A and there admixed with the carburetted air. The amount of water drawn from the tank T will be in accordance with the speed of the engine or in other words when the engine is running at its lower speed the superheated steam admixed with the carburetted air will not cause the engine to skip or stop and when the lever 15 is opened up such movement automatically opens the valve 16, increasing the supply of water as the supply of gas is increased and thus assuring a proper mixture at all times.

It is desirable in cold weather to cut off the water supply entirely until the engine and boiler B is hot and for this reason the valve 19 hereinbefore referred to is employed. Under the foregoing mentioned conditions the valve 19 is first closed and after the engine has run a time sufficient to effect the desired heating, said valve 19 is opened and thereafter the desired flow of the water will be automatically controlled by the valve 16 and the lever 15 associated therewith.

In order to obtain the highest efficiency I find it of advantage to substantially encase or inclose the manifold M with a lamination 20 of asbestos in order to avoid the cooling effect of the atmosphere or from a fan.

In the embodiment of my invention as illustrated in Figure 6 the boiler B' is arranged exteriorly of the manifold M' but the construction of the boiler B' is substantially the same as hereinbefore described with respect to the boiler B with the exception that the partitions 21 are interposed between the periphery of the manifold M' and the inner wall of the boiler B'. In this embodiment of the invention the boiler B' also extends substantially entirely around the manifold M'.

The embodiment of my invention as illustrated in Figure 7 is substantially the same as disclosed in Figure 6 except that the boiler B'' extends only partially around the manifold M''.

As disclosed in Figures 8 and 9 the boiler X is separable from the manifold Y and is suitably mounted thereon. The requisite heating of the boiler X being effected by the heat radiating from the manifold Y. The boiler X in this last embodiment of my invention is substantially the same as that disclosed in Figure 6 or 7 except that the portion 9' of the conduit 8' extends through both of the heads 3' and 4' of the boiler, the extremity of the portion 9' exteriorly of the head 4' having engaged therewith a holding cap or nut 22.

From the foregoing description it is thought to be obvious that an internal combustion engine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with the exhaust manifold of an internal combustion engine, a removable head plate therefor, a boiler carried by said plate and extending within the manifold when the plate is in applied position, said boiler being of a maximum diameter less than the internal diameter of the manifold to provide a space within the manifold extending around the boiler, inwardly disposed partition plates carried by the removable head plate of the manifold and the opposite end of the boiler, the plates of the removable head plate terminating inwardly of the outer end of the boiler, a second set of plates terminating inwardly of the removable head plate, said plates being alternately arranged, a partition completely bridging the space between the removable head plate of the manifold and the head of the boiler, a conduit adapted for communication with a source of water supply and in communication with the boiler through the removable head of the manifold at a point to one side of the last named partition, and a conduit extending within the boiler at the opposite side of said last named partition and terminating adjacent the head of the boiler, said second named conduit being adapted for communication with the intake manifold of an internal combustion engine.

2. In combination with the exhaust manifold of an internal combustion engine, a removable head plate therefor, a boiler carried by said plate and extending within the manifold when the plate is in applied position, said boiler being of a maximum diameter less than the internal diameter of the manifold to provide a space within the manifold extending around the boiler, inwardly disposed partition plates carried by the removable head plate of the manifold and the opposite end of the boiler, the plates of the removable head plate terminating inwardly of the outer end of the boiler, a second set of plates terminating inwardly of the removable head, said plates being alternately arranged, a partition completely bridging the space between the removable head plate of the manifold and the head of the boiler, a conduit adapted for communication with a source of water supply and in communication with the boiler through the removable head of the manifold at a point to one side of the last named partition, and a conduit extending within the boiler at the opposite side of said last named partition and terminating adjacent the head of the boiler, said second named conduit being adapted for communication with the intake manifold of an internal combustion engine, all of said partitions being substantially radially disposed with respect to the boiler and having their inner marginal portions connected.

3. In combination with the intake manifold and exhaust manifold of an internal combustion engine, said exhaust manifold being enlarged above the conventional size and having an opening in its end opposite from its discharge end, a steam boiler insertible within the exhaust manifold through said opening, said boiler, when applied, closing said opening, said boiler having a water inlet and a superheated steam outlet connected therewith and entirely free of the walls of the exhaust manifold, means for connecting the superheated steam outlet with the intake manifold, and deflecting means provided within the boiler to direct, convey and retard steam generated in said boiler against the walls thereof so that it will become superheated before it passes to the intake manifold.

4. In combination with the intake manifold and exhaust manifold of an internal combustion engine, said exhaust manifold being enlarged above the conventional size and having an opening in its end opposite from its discharge end, a steam boiler insertible within the exhaust manifold through said opening, said boiler, when applied, closing said opening, said boiler having a water inlet and a superheated steam outlet connected therewith and entirely free of the walls of the exhaust manifold, means for connecting the superheated steam outlet with the intake manifold, and deflecting means provided within the boiler to direct, convey and retard steam generated in said boiler against the walls thereof so that it will become superheated before it passes to the intake manifold, said boiler and the parts concomitant thereto being bodily applied or removed.

In testimony whereof I hereunto affix my signature.

CHARLES W. CROWELL.